S. B. SMITH.
INCUBATOR.
APPLICATION FILED OCT. 26, 1916.

1,262,860.

Patented Apr. 16, 1918.
2 SHEETS—SHEET 1.

INVENTOR.
S.B.SMITH.
BY Staley & Bowman
ATTORNEYS

S. B. SMITH.
INCUBATOR.
APPLICATION FILED OCT. 26, 1916.

1,262,860.

Patented Apr. 16, 1918.
2 SHEETS—SHEET 2.

INVENTOR.
S. B. SMITH.
BY Staley & Bowman
ATTORNEYS.

UNITED STATES PATENT OFFICE.

SAMUEL B. SMITH, OF CLEVELAND, OHIO, ASSIGNOR TO THE BUCKEYE INCUBATOR CO., OF SPRINGFIELD, OHIO, A CORPORATION OF OHIO.

INCUBATOR.

1,262,860.  Specification of Letters Patent.  Patented Apr. 16, 1918.

Application filed October 26, 1916. Serial No. 127,915.

*To all whom it may concern:*

Be it known that I, SAMUEL B. SMITH, a citizen of the United States, residing at Cleveland, in the county of Cuyahoga and State of Ohio, have invented certain new and useful Improvements in Incubators, of which the following is a specification.

The improved apparatus and method, is particularly designed for extensive operations wherein a chamber of large dimensions is adapted to contain thousands of eggs in separate trays arranged in tiers and the method of heating is such that the heated air is adapted to the eggs in various stages of incubation. There is a forced circulation of hot air through the chamber which is adapted preferably to maintain all eggs at temperatures between 100° and 105° Fahrenheit approximately and this improved system contemplates that fresh eggs will be placed in a horizontal plane, preferably by means of trays supported in horizontal planes, and after the eggs have been subject to the circulation of hot air for a predetermined time (the air circulating largely around the eggs) they will be placed in a tilted or inclined position in a different location but still subject to the same column of air and at this period of incubation they will be tilted in different planes at regular intervals during the time they remain in this latter position, and after they have remained for a predetermined time they will be again moved to a different position with reference to the forced circulation of hot air and so placed therein that the air will tend to keep the eggs below 105° temperature, and in this last named position the air will be forced to pass between the different eggs and will in effect act as a cooling medium for the eggs. The temperature of circulating air should be such as will prevent the eggs in the early stage of incubation from falling below 100° and the speed or velocity of the circulating air should be such as to carry the heat away from the eggs in the later stage of incubation and thereby hold the temperature of those eggs at 105° or slightly below that. It is manifest that the temperature will remain practically the same throughout the column of eggs, but the air is impelled with sufficient velocity to carry the heat away from the eggs which happen to be in the advanced stage of incubation.

Figure 1:
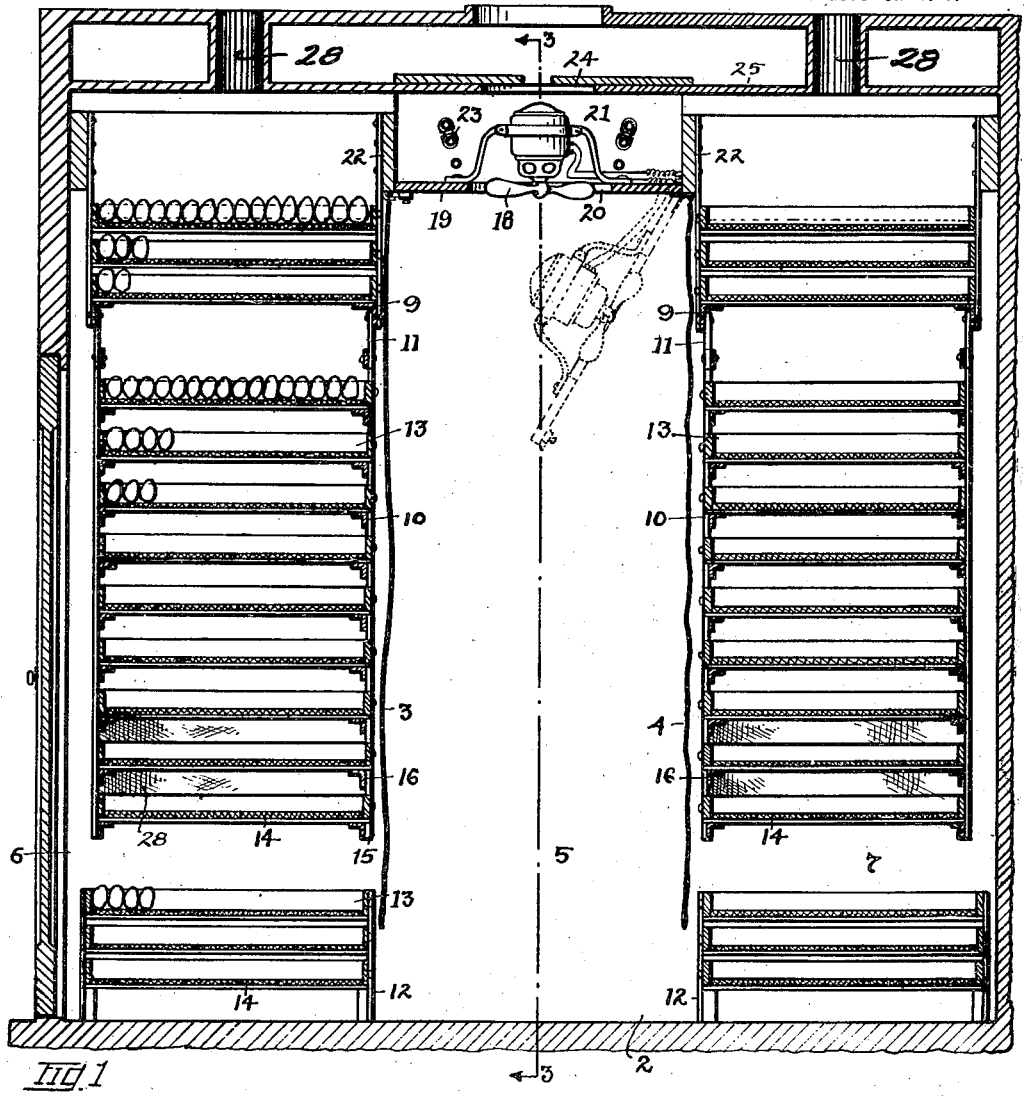
Figure 1 is a cross section of my improved incubator.
Figure 2:
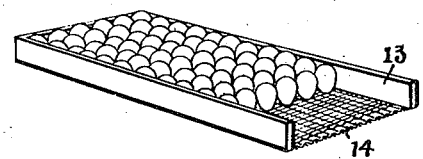
Fig. 2 is a perspective view of one of the egg trays with one end removed to more clearly disclose the open mesh bottom.

The invention comprises a walled chamber 2 corresponding in size to that of an ordinary room, say approximately nine feet high, eight to ten feet wide, and of any desired length, and this chamber is subdivided longitudinally by two parallel rows of curtains 3 and 4 to provide a central compartment or corridor 5 and side compartments 6 and 7. Entrance to the corridor is gained by a door 8, and the compartments behind the curtains contain elevated stationary racks 9 which are within convenient reach of the attendant for introducing the fresh supply and from which elevated position the trays may be shifted at the proper time to a tier of tilting racks 10 on a lower plane and suspended therefrom by links 11. A series of stationary racks 12 are also arranged beneath the tilting racks 10, and all of said racks are of open construction and of the same size to permit interchange of the shallow trays 13 for the eggs to be hatched. These trays are provided with open mesh bottoms 14 upon which the smaller ends of the eggs rest in close and solid formation, and each tray of eggs occupies the upper rack 9 for the first three days, and is then transferred to a place in the upper end of the tilting rack 10. During the next fifteen days the trays in the tilting rack are shifted from higher to lower planes therein and tilted at frequent intervals to stand in oppositely-inclined positions. The tilting of the eggs is preferably arranged to put the eggs substantially on their sides. When the eggs in the lower-most trays in the tilting racks 10 are about ready to hatch each tray is transferred to the stationary rack 12 where the chicks may be removed as occasion requires.

Each tilting rack 10 comprises perpendicular corner bars 15 pivotally united by a series of cross bars 16 carrying connecting angle irons 17 extending from front to rear at each side and upon which the trays are adapted to be slidably supported. The links 11 are pivotally connected at the center of the uppermost cross bars 16 of each tilting rack, thus permitting an entire series of trays to be placed in an inclined position by merely raising or lowering one side of the rack by hand engagement. The weight and friction and balance of the parts cause the trays to remain in any shifted position, whether horizontal or inclined. The fans or series of fans 18 mounted upon the hinged trap doors 19 forming the ceiling of the central corridor 5 constitute the means for forcing the hot air through the chamber and there are circular openings 20 provided in said doors within which the fans are arranged properly. The longitudinal space 21 above the fans has open communication above the side walls 22 with the upper ends of the rack compartments behind the curtains 3 and 4 and these curtains extend a sufficient distance, as indicated in Fig. 1, to cause the heated air distributed by the fans to pass downwardly through the central corridor to a point near the bottom of the chamber where it can pass into the space occupied by the trays. As explained later the trays near the bottom are preferably arranged so that the air is forced to pass between the eggs in each tray thereby cooling or holding the temperature of those eggs down. Thence the air passes into spaces above the lower series of trays until it reaches the distributing space 21 above the fan. Coils of heating pipe 23 are arranged in the space 21 to heat the air and more or less fresh air may be taken in through the valved opening 24 above the space 21 and this fresh supply of air may be charged with steam to a greater or less degree by means of a valve controlled jet or pipe 26 see Fig. 3. The outlets 28 for the release of foul air are made of such restricted capacity as to prevent the undue escape of moisture. It is possible to limit the openings and so conserve the moisture by reason of the vitalizing effect of the power driven current upon the body of the air within the chamber. By lowering the hinged trap doors, the motor and fan are also easily reached for inspection, etc.

Figure 3:
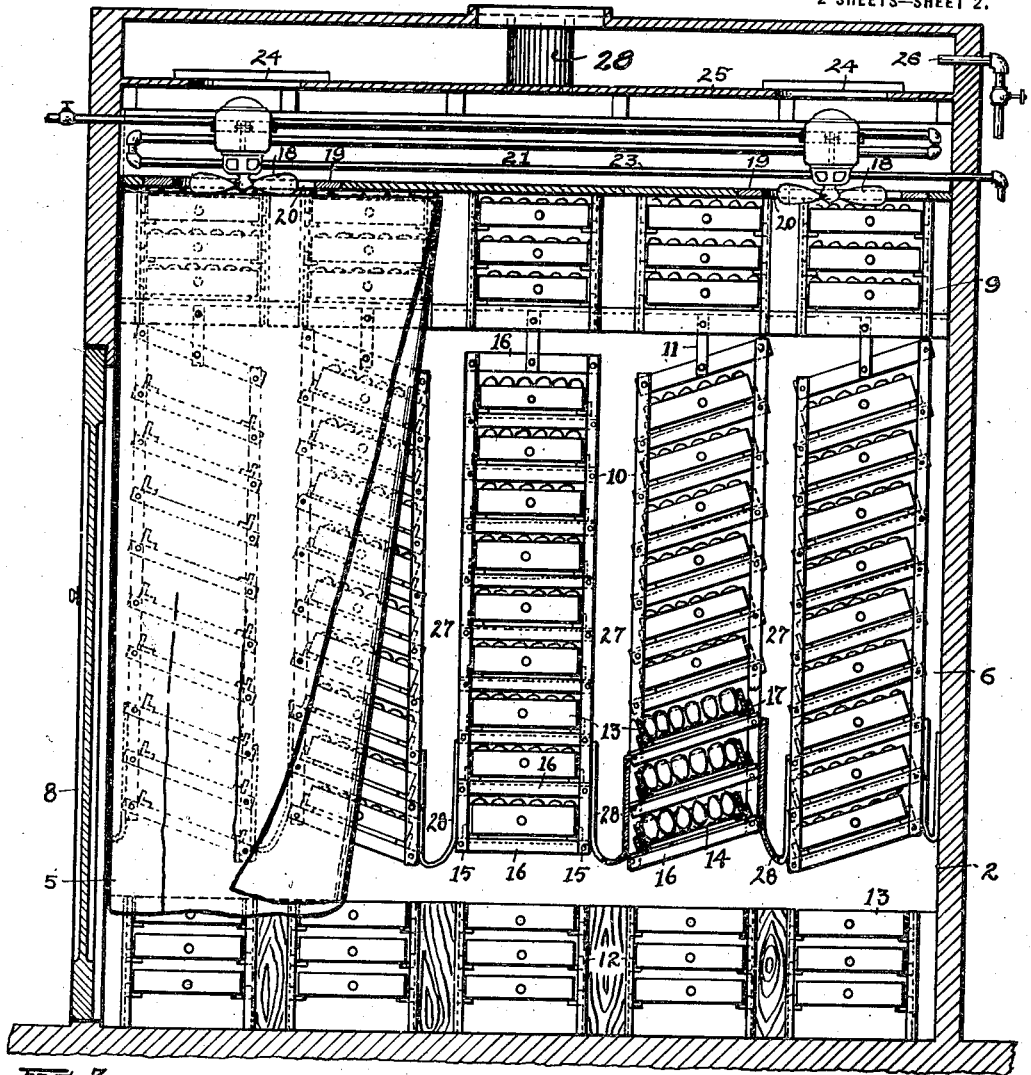
Fig. 3 is a vertical section of the incubator on line 3—3, Fig. 1.
Figure 4:
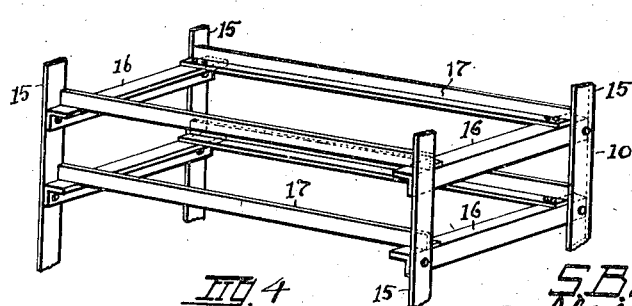
Fig. 4 is a perspective view of a portion of one of the tilting racks for the trays.

In Fig. 3 only a single curtain 3 is shown in place, the curtain or curtains at the right being entirely removed to disclose the racks and trays in full lines, and it will be also noted that the vertical spaces 27 between the adjacent tilting racks 10 are closed at their lower ends by flexible strips of fabric which are attached to and extend upward at each side of each rack so as to compel the air to circulate through the mesh bottom and around and about each egg as heretofore referred to, and as the eggs further advanced in incubation are contained in these lower trays and as the danger is that the temperature will rise in these eggs to a point injurious to incubation the improved method disclosed herein permits the circulating air to act as a medium to prevent the over heating at this stage of incubation and this is accomplished by promoting an induced draft within the lower trays. It is obvious that the fans can be so arranged and can be operated at such speed as to cause the hot air to circulate fast enough to keep the temperature throughout the chamber between the limits of 100° and 105°.

It, therefore, appears that the improved apparatus and method contemplates the application of hot air circulating in a column with such speed as to keep the temperature substantially uniform and so arranging the eggs that the fresh eggs are placed at one point in the column of air and held in a horizontal plane until they reach a predetermined stage of incubation and then put at a different point in the same column of air and kept in planes inclined to the horizontal and thereafter placed at such a point in the column of air that the forced draft of air acts to hold the eggs at a uniform temperature and to prevent them from becoming overheated and thereafter placing the eggs into final position for the hatching operation.

Any suitable thermostatic means may be employed for regulating the temperature, such for instance as a thermostat commonly employed in incubators of a well-known construction and illustrated in Letters-Patent No. 1,111,138, dated September 22nd, 1914, which thermostat may be suitably connected to the valve controlling the steam or hot water, as the case may be, which passes through the pipes 23.

Having thus described my invention, I claim:—

1. The method of hatching a plurality of eggs by arranging them at different levels in a closed chamber having restricted openings of sufficient capacity for the escape of foul air without undue loss of moisture and applying a current of heated air, said current being created by means other than variations of temperature and of sufficient velocity to circulate, diffuse and maintain the air throughout the chamber at substantially the same temperature, whereby the air will be vitalized, the moisture conserved and the units of heat will be carried from the eggs in the more advanced stage of incubation to those in a less advanced stage for the purpose specified.

2. The method of hatching a plurality of eggs by arranging them at different levels in a closed chamber having restricted openings of sufficient capacity for the escape of foul air without undue loss of moisture and applying a power driven current of heated air in an adjacent chamber through openings into the egg chamber, said current being of sufficient velocity to circulate, diffuse and maintain the air throughout the egg chamber at substantially the same temperature, whereby the air will be vitalized, the moisture conserved and the units of heat will be carried from the eggs in the more advanced stage of incubation to those in a less advanced stage for the purpose specified.

3. The method of hatching a plurality of eggs by arranging them at different levels in a closed chamber having restricted openings of sufficient capacity for the escape of foul air without undue loss of moisture and applying a vertically directed current of heated air in an adjacent chamber to circulate in said egg chamber through upper and lower openings between said chambers, said current being created by mechanically moving means of such velocity as to diffuse and maintain the air throughout the egg chamber at substantially the same temperature whereby the air will be vitalized, the moisture conserved and the units of heat will be carried from the eggs in the more advanced stage of incubation to those in the less advanced stage for the purpose specified.

4. In an incubator, a closed chamber having a central corridor provided with an air-distributing space in its upper portion and a power-driven fan in said space, curtains at each side of said corridor, arranged to permit the air to circulate from the bottom of the chamber into the part of the chamber behind the curtains, passageways connecting the air distributing space with the corridor and the parts of said chamber behind the curtains, separate stationary and tilting racks behind said curtains, egg-trays having open-mesh bottoms removably mounted upon said racks, and means to heat the air circulated through said chamber.

5. In an incubator, a closed chamber with a vertically disposed partition to provide a corridor having upper and lower passage ways to said chamber, egg trays arranged at different levels in said chamber, a power driven fan creating a current in said corridor to circulate through said passage ways and egg trays, said chamber having restricted openings of sufficient capacity for the discharge of foul air without undue loss of moisture and means to heat the air circulated through said chamber.

In testimony whereof, I have hereunto set my hand this 20th day of October, 1916.

SAMUEL B. SMITH.

Witnesses:
HANNAH D. PLAIN,
IDA M. SMITH.